United States Patent [19]

McBryde

[11] 4,315,747
[45] Feb. 16, 1982

[54] HOMOLINEAR COMPOSITE EQUAL-AREA WORLD PROJECTIONS

[76] Inventor: F. Webster McBryde, 10100 Falls Rd., Potomac, Md. 20854

[21] Appl. No.: 811,318

[22] Filed: Jun. 29, 1977

[51] Int. Cl.³ .............................................. G09B 29/00
[52] U.S. Cl. ...................................... 434/150; 283/34
[58] Field of Search ................. 35/40, 41, 42; 283/34, 283/35; 434/150

[56] References Cited

U.S. PATENT DOCUMENTS 1,050,596  1/1913  Bacon .................................... 283/34

OTHER PUBLICATIONS

*Elements of Cartography,* by Robinson et al., Third Edition, 1969, John Wiley & Sons, Inc. publisher, 2 title pages, pp. 222–233, 380–383.
*Equal–Area Projections for World Statistical Maps,* by McBryde et al., Special Publication No. 245, U.S. Dept. of Commerce, Coast & Geodetic Survey, 1949, pp. 1–12.
*The Homolosine Projection: A New Device for Portraying the Earth's Surface Entire,* by J. Paul Goode, pp. 119–125, published 1925.
*An Introduction to Anthropology,* by Beals and Hoijer, Third Edition, The MacMilian Company, New York, title page, pp. IX, X, 1965.

*Primary Examiner*—William H. Grieb
*Attorney, Agent, or Firm*—Cushman, Darby & Cushman

[57] ABSTRACT

An equal-area homolinear composite world map having parallels of latitude parallel to the equator. The map combines an equatorial map section and polar map sections. The equatorial map section is the equatorial portion of a fusiform equal-area world map and the polar sections are the polar portions of a flat-polar equal-area world map. The fusiform and flat-polar maps are prepared according to mapping equations which are the same except that the latter are adjusted to provide flat poles.

2 Claims, 4 Drawing Figures

HOMOLINEAR COMPOSITE EQUAL-AREA WORLD PROJECTIONS

The present invention relates to a category of world map projections in which the relative areal extent of all features is the same as that of corresponding features on the earth. These are known as equal-area projections. In the present invention, two related equal-area projections are juxtaposed to form a composite so as to reduce distortions, which are inherent in all equal-area world maps.

BACKGROUND OF THE INVENTION

A map is a two-dimensional representation of features seen on the substantially spherical surface of the earth. Unlike a terrestrial globe, which might be regarded as a spherical map, a two-dimensional map on a plane cannot depict the surface of the globe without distortion. Various "projections" have been developed in attempts to minimize the effects of these distortions or preserve some desirable aspect without distortion.

As used herein, the term "projection" refers to a systematic representation of intersecting coordinate lines on a flat surface upon which features from the curved surface of the earth or other celestial body are mapped in accordance with a prescribed mathematical relationship between the x and y coordinates of various points on the map and the latitudes and longitudes of corresponding points on the globe. The term "graticule" is used to refer to the systematic representation of coordinate lines in accordance with the said mathematical relationship, so that a "projection" is derived by plotting features on the "graticule."

The best known world map is that shown on Mercator's conformal projection, a navigation chart which, in effect, projects the spherical surface of a globe in a certain manner onto a surrounding cylinder of the same equatorial diameter, the cylinder then being unrolled to form a flat map. On such a map, the areal extent of features near the North and South Poles, such as Alaska, Greenland and Antarctica, is enormously enlarged relative to the areas in equatorial regions and relative to their true size on the earth.

Maps of this kind are not suitable for statistical purposes, such as depicting population densities. Therefore, a category of maps has been developed known as equal-area projections in which the areal extents of features on the map are the same in proportion as those of the corresponding features on the earth. Many such projections are depicted in the text "Equal-Area Projections for World Statistical Maps", by F. Webster McBryde and Paul D. Thomas, U.S. Government Printing Office, 1949, and the mathematical bases for the graticules of equal-area projections are also described and tabulated in that text. Known equal-area maps include "fusiform" types in which meridians converge to points at the top and bottom of the map, and "flat-polar" projections, which are a compromise with cylindrical projections, wherein the poles are depicted as straight lines, parallel to and shorter than the equator so that meridians converge towards the poles but do not meet at a point. In one type of such projection, known as Eckert's Projections, the poles are one-half the length of the equator. As described in the aforesaid text, other maps of this general category have been developed in which the poles are lines parallel to the equator, but shorter than in Eckert's Projections.

Implicit in equal-area projections are certain linear distortions of distances and distortions in shape. In other words, even though all areas are shown in correct size relative to the earth and to one another, some linear distances become distorted. As a result, the map length of, say, Greenland, may be increased relative to its width. This, in turn, may cause the shape of Greenland to be elongated or flattened, and different from its real or true shape, even though its areal extent is correct and it retains its proper relationship to that of other features on the map.

An attempt has been made to overcome those distortions with a composite heterolinear projection, i.e., by combining high latitude (northern and southern) portions of one projection with low and middle latitude (northern and southern) portions of another projection. The resultant composite projection, known as Goode's Homalosine, combines the sinusoidal equal-area projection for regions of latitudes 0-40 degrees north and south with the Mollweide homalographic equal-area projection for regions from 40-90 degrees latitude (north and south). However, even with this correction, there are significant distortions of the type described above. Also meridian curves are different in the two component projections and neither is flat-polar; the Sinusoidal projection is fusiform, with meridians as sine curves, and the homalographic projection is an oval, with eliptical meridians.

SUMMARY OF THE INVENTION

The present invention provides an advance in the art of map-making which reduces this type of distortion to provide an equal-area map in which the appearance of various areas more nearly corresponds to their actual shape on the earth. Briefly, the new maps, which are to be called "homolinear" composite projections, combine parts of two equal-area projections of a type in which parallels of latitude are straight and parallel to the equator and meridians are all of similar curves. Both projections are prepared according to the same basic mapping equations but differ in that one is a flat-polar map derived solely by modifying the mapping equations of the other map, which has fusiform, or pointed poles. Unlike Goode's Homalosine Projection, which is heterolinear (having different meridian curves in the segments which are juxtaposed), the present invention relates to a homolinear projection (having related meridian curves in the segments which are juxtaposed). In the pair of projections used in the present invention, assuming they are prepared on the same scale, there is a pair of north and a pair of south parallels of latitude having the same length, even though the equators are of different lengths and, in one, the poles are represented as lines and, in the other, they are represented as points. The northern and southern regions of the flat-polar projection and the low latitude region of the fusiform projection are joined along those parallels, north and south, that have lengths in common. Preferably the maps are constructed so that this common parallel is in the range of 50° to 60° north and south latitudes.

In referring to a homolinear composite projection, reference is made to juxtaposition of two projections having parallels of latitude parallel to the equator and prepared according to basically the same mathematical relationship, except that in one case the projection is of a type having fusiform poles, while the other is modified from the first so that the poles are lines corresponding, say, to $\frac{1}{4}$ to $\frac{1}{2}$ the length of the equator.

BRIEF DESCRIPTION OF FIGURES IN THE DRAWINGS

Reference is made to the drawing in which.

DETAILED DESCRIPTION OF PREFERRED EMBODIMENT

An understanding of the relationship between the two projections which are combined in maps according to the present invention is assisted by first reviewing the general principles applicable to equal-area projections. For convenience, where possible, equations are numbered as in the foregoing text.

I. General Equations for Fusiform Projection

The above-mentioned text provides general equations for drawing the graticules of equal-area projections in which the parallels of latitude are straight lines, as follows (equations are numbered in accordance with the aforesaid text):

Mapping Equation
$$x = \frac{R\lambda \cos \Phi}{f'(\Phi)}, \quad y = Rf(\Phi). \tag{3}$$

In these equations, $\Phi$ is the latitude and $\lambda$ the longitude of a particular point on the earth and x and y give the coordinates of the corresponding point on the projection whose graticule conforms to equations (3), R is the radius of the sphere to which these equations relate, i.e. the radius of the earth or globe. The function $f(\Phi)$ determines the vertical spacing of the various parallels of latitude on the map, which are horizontal lines. The function is taken as equal to zero when $\Phi$ is zero, $f(0)=0$, so that the equator becomes the x axis on the map. The value of $\Phi$ ranges from zero at the equator to $\pm 90°$ ($\pi/2$ radians) at the poles.

The form of the equation for x is dictated by the mathematics of the requirement that the projection be of the equal-area type. A second condition arises because the expression $f'(\Phi)$, which is the derivative of $f(\Phi)$, appears in the denominator of the equation for x; it cannot be zero, $f'(\Phi) \neq 0$, otherwise x does not remain finite.

In computing the graticule of a fusiform projection, the y axis is taken as corresponding to any chosen meridian of longitude and the value of $\lambda$ ranges from zero for this central meridian to 180° ($\pi$ radians) in each direction, to cover the entire surface. The meridians are a family of curves of the same type with $\lambda$ their parameter.

At the equator, where $\Phi=0$, and for $\lambda=\pi$, (180°), the value of x becomes:

Half width
$$x_o = \frac{R\pi}{f'(0)}.$$

This is the half width of the map. When $\lambda=0$ and $\Phi=\pi/2$, (90°), the value of y is given by:

Half height
$$y_o = Rf(\pi/2),$$

which is the half height of the map. The ratio of height to width hence is:

Ratio ht/wdth
$$\frac{y_o}{x_o} = \frac{f(\pi/2) \cdot f'(0)}{\pi}. \tag{4}$$

This ratio can be fixed according to the height to width ratio of the map which is desired, thereby imposing a condition on the function. Ordinarily this ratio is set at 1:2.

When $\Phi$ is $\pm 90°$, that is, at the poles, the value of x is zero (since $\cos 90°=0$), no matter what the value of $\lambda$. Hence, a projection prepared according to this set of equations is fusiform, i.e. the width decreases from the full width at the equator to zero at the poles, thus coming to a point at each pole.

II. General Equations for Flat-Polar Map

The graticule of a corresponding flat-polar map is derived from equations (3). An additive factor is introduced in the equation for x which will result in x not being zero at the poles for all values of $\lambda$. Further adjustment must be made in order for the resultant projection to remain equal-area. The derivation of modified equations for such a map, corresponding to equations (3), is explained in the foregoing text, and yields general mapping equations which are written as:

Mapping equations
$$x = \frac{R\lambda}{Mn}\left(k + \frac{\cos \alpha}{f'(\alpha)}\right), \quad y = RMf(\alpha). \tag{8}$$

In these equations, M and k are arbitrary constants and n is written for the expression $(kf'(\pi/2)+1)$. The variable $\Phi$ has been replaced by an auxiliary variable $\alpha$, but with $f(\alpha)$ the same mathematical function as $f(\Phi)$. The relation of the two variables is given by:

$$n \sin \Phi = kf(\alpha) + \sin \alpha. \tag{7}$$

From this relation and previous expressions, $\alpha$ is 0 when $\Phi$ is 0 and $\alpha = \pi/2$ when $\Phi = \pi/2$, but the spacing of the parallels of latitude between these two points is different in a projection derived from equation (8) from what it is in a projection derived from equation (3). In working with equations (8), it is first necessary to calculate from equation (7) the value of $\alpha$ corresponding to each given latitude $\Phi$.

The length of the semi-equator is obtained by setting $\alpha=0$ and $\lambda=\pi$ in the equation for x in (8). This is:

Half width
$$x_o = \frac{R\pi}{Mn}\left(k + \frac{1}{f'(0)}\right),$$
$$= \frac{R\pi}{Mn} \cdot \frac{(kf'(0)+1)}{f'(0)},$$
$$= \frac{R\pi m}{Mnf'(0)}$$

where m has been written for the last expression in parentheses (kf'(0)+1). The semi-height is obtained by setting $\lambda=0$ and $\alpha=\pi/2$. This is:

Half height $\qquad y_o = RMf(\pi/2)$

The ratio of the height to the width of the map thus is given by:

Ratio ht/wdth $\qquad \dfrac{y_o}{x_o} = \dfrac{nM^2 f(\pi/2) \cdot f'(0)}{m\pi}$ (9)

It is desirable to have the ratio of the axes in the flat-polar map the same as the ratio in the fusiform or pointed polar map. Setting equations (4) and (9) equal to each other gives:

Equal ratio $\qquad M^2 = \dfrac{m}{n} = \dfrac{kf'(0)+1}{kf(\pi/2)+1}$. (10)

This imposes a condition and equations (8) are rewritten with n replaced by m/M²:

Mapping equations $\qquad x = \dfrac{RM\lambda}{m}\left(k + \dfrac{\cos\alpha}{f'(\alpha)}\right), y = RMf(\alpha)$. (11)

When $\lambda=\pi$, the x coordinate when $\alpha$ is 90° is $x=RM\pi k/m$. This is the half length of the line segment which has replaced the polar point. The length of x when $\lambda=\pi$, $\alpha=0$, the semi-equator, is $Rm\pi/f'(0)$. The ratio of the two is:

Ratio pole/equator $\qquad \dfrac{x_{90}}{x_o} = \dfrac{kf'(0)}{m}$ (12)

This gives the ratio of the length of the line segment which has replaced the pole, to the length of the equator.

III. Sine Series—Fusiform

The present invention is particularly concerned with two series of projections, i.e. in which particular functions are used in equations (3) and (8). In the first series, known as the sine series, the function $f(\Phi)$ is taken as:

$$f(\Phi) = p \sin \dfrac{\Phi}{q}, \text{ whence } f'(\Phi) = \dfrac{p}{q} \cos \dfrac{\Phi}{q}.$$

This satisfies the requirements that f(0)=0, and also $f'(\Phi) \ne 0$ (except if q=1 or less there will be an infinite value). Equations (3) and (4) for the fusiform map then become (the numbering below with the subscript "s" indicates the number of the general equation above corresponding to the sine-series equation; numbering in parenthesis indicates number used in the foregoing text to identify the same equation):

Mapping equation $\quad 3s\,(13)\ x = \dfrac{Rq\lambda}{p}\cos\Phi\sec\dfrac{\Phi}{q}, y = Rp\sin\dfrac{\Phi}{q}$.

Ratio ht/wdth $\quad 4s\,(15)\ \dfrac{y_o}{x_o} = \dfrac{p^2}{q\pi}\sin\dfrac{\pi}{2q}$.

These have the arbitrary parameter p and q. A series of these projections for various values of p and q is shown by the McBryde-Thomas text. This series is referred to as the sine series because the sine function is used, though the meridians are not sine curves on the projection (except a limiting case referred to below).

IV. Sine Series—Flat-Polar

The equations for the corresponding flat-polar projections using the same function are given.

Mapping equations
$$x = \dfrac{R\lambda}{Mn}\left(k + \dfrac{q}{p}\cos\alpha\sec\alpha/q\right), y = RMp\sin\alpha/q \quad 8s$$

$$n\sin\Phi = kp\sin\alpha/q + \sin\alpha\ n = kp\sin\dfrac{\pi}{2q} + 1 \quad 7s$$

Half width $\qquad x_o = \dfrac{R\pi mq}{Mnp} \quad m = \dfrac{kp}{q}+1$

Half height $\qquad y_o = RMp\sin\dfrac{\pi}{2q}$

Ratio ht/wdth $\qquad \dfrac{y_o}{x_o} = \dfrac{M^2 p^2 n \sin\pi/2q}{\pi mq} \quad 9s$ If this ratio is made the same as the ratio 4s for the fusiform sine series $$M^2 = \dfrac{m}{n} = \dfrac{kp/q + 1}{kp\sin\pi/2q + 1}. \quad 10s$$

The mapping equations 8s are rewritten with n replaced by m/M².

Mapping equations
$$x = \dfrac{RM\lambda}{m}\left(k + \dfrac{q}{p}\cos\alpha\sec\dfrac{\alpha}{q}\right), y = RMp\sin\alpha/q \quad 11s$$

When $\lambda=\pi$, the x coordinate when $\alpha=90°$ is $RM\pi k/m$ which is the half length of the line segment which has replaced the poles. Dividing this $x_{90}$ by $x_o$ the half equator, given above, results in Ratio pole/equat. $\qquad \dfrac{x_{90}}{x_o} = \dfrac{kp}{mq} = \dfrac{kp}{kp+q}. \quad 12s$ This is the ratio of the length of the line segment which has replaced the pole to the length of the equator.

V. Tangent Series

In the second series particularly referred to here, known as the tangent series, the function $f(\Phi)$ is taken as:

$$f(\Phi) = p\tan\dfrac{\Phi}{q}, \text{ whence } f'(\Phi) = \dfrac{p}{q}\sec^2\dfrac{\Phi}{q}.$$

These meet the requirements that f(0)=0 and $f'(\Phi) \ne 0$. Equations 3 and 4 for the fusiform map then become:

Mapping equations $\quad x = \dfrac{Rq}{p}\lambda\cos\Phi\cos^2\dfrac{\Phi}{q}, y = Rp\tan\dfrac{\Phi}{q}$. $\quad 3t\,(14)$ Ratio ht/wdth $\qquad \dfrac{y_o}{x_o} = \dfrac{p^2}{q\pi}\tan\dfrac{\pi}{2q}$. $\quad 4t\,(16)$ For the modified flat-polar tangent series projection, the equations take the form:

$$x = \frac{R\lambda}{Mn}\left(k + \frac{q}{p}\cos\alpha\cos^2\frac{\alpha}{q}\right), y = RMp\tan\frac{\alpha}{q}$$  (8t)

$$n\sin\Phi = kp\tan\frac{\alpha}{q} + \sin\alpha \qquad n = kp\tan\frac{\pi}{2q} + 1$$  (7t)

Ratio ht/wdth $\qquad \frac{y_o}{x_o} = \frac{M^2p^2n}{qm\pi}\tan\frac{\pi}{2q} \qquad m = \frac{kp}{q} + 1$  (9t)

$$M^2 = \frac{m}{n} = \frac{kp/q + 1}{kp\tan\pi/2q + 1}$$  (10t)

The mapping equations 8t are rewritten with n replaced by $m/M^2$.

Mapping equations $$x = \frac{RM\lambda}{m}\left(k + \frac{q}{p}\cos\alpha\cos^2\frac{\alpha}{q}\right), y = RMp\tan\frac{\alpha}{q}$$  (11t)

Ratio pole/equat. $\qquad \frac{x_{90}}{x_o} = \frac{kp}{mq} = \frac{kp}{kp + q}$  (12t)

VI. Composites

The two series of fusiform projections and their corresponding flat-polar modifications are the types with which the present invention is especially concerned. Two projections are combined, one fusiform and the other a flat-polar modification of the same fusiform projection. There is one parallel of latitude, north and south, which has the same length on each projection; the central low-latitude part, between these parallels, of the fusiform projection is combined with the upper and lower high-latitude parts, of the corresponding flat-polar projection. The parameters k, p and q are selected to give desired characteristics to each projection and the combination. Variation of these parameters induces variations in the ratio of the length of the line which has replaced the pole to the length of the equator, and in the location of the common parallel. R represents the radius of the globe which is projected. In general, the numerical values in the mapping and auxiliary equations are not simple but for the example given are comparatively so.

The application of these parameters to the general equations can be further understood through a specific example of the derivation of a particular fusiform and a flat-polar projection which can be used to form a composite projection in accordance with the invention. The projection which will be used for the fusiform part is the Mercator Sinusoidal projection, which actually is a limiting case of both the sinusoidal and tangent series.

VII. Example: Fusiform Part

Referring to the tangent series fusiform projections, equations 3t (14), it is noted that when q is very large, the angle of which the tangent is taken, $\Phi/q$, becomes very small. For very small angles, the value of the tangent is very close to the angle itself (in radians—the same is true of the value of the sine of the angle) and the value of the cosine is very close to 1. A limiting case is obtained by setting $\tan\Phi/q = \sin\Phi/q = \Phi/q$ and $\cos\Phi/q = 1$. Equations 3t (14) (and also equations 3s(13)) reduce to:

$$x = R\frac{q\lambda}{p}\cos\Phi, y = R\frac{p}{q}\Phi.$$

The ratio of the height to the width of this projection (from equation (4)) is:

$$\frac{y_o}{x_o} = \frac{p^2}{2q^2}$$

If this ratio is taken as $\frac{1}{2}$, we then have p=q which hence disappear from the mapping equations, which become simply:

$$x = R\lambda\cos\Phi, y = R\Phi.$$  I

This fusiform projection is selected for the detailed illustrative example, not only because of the simplicity of the equations, but also because of the nature of the results obtained with it. The meridians on the map are cosine curves (displaced sine curves).

Figure 1:
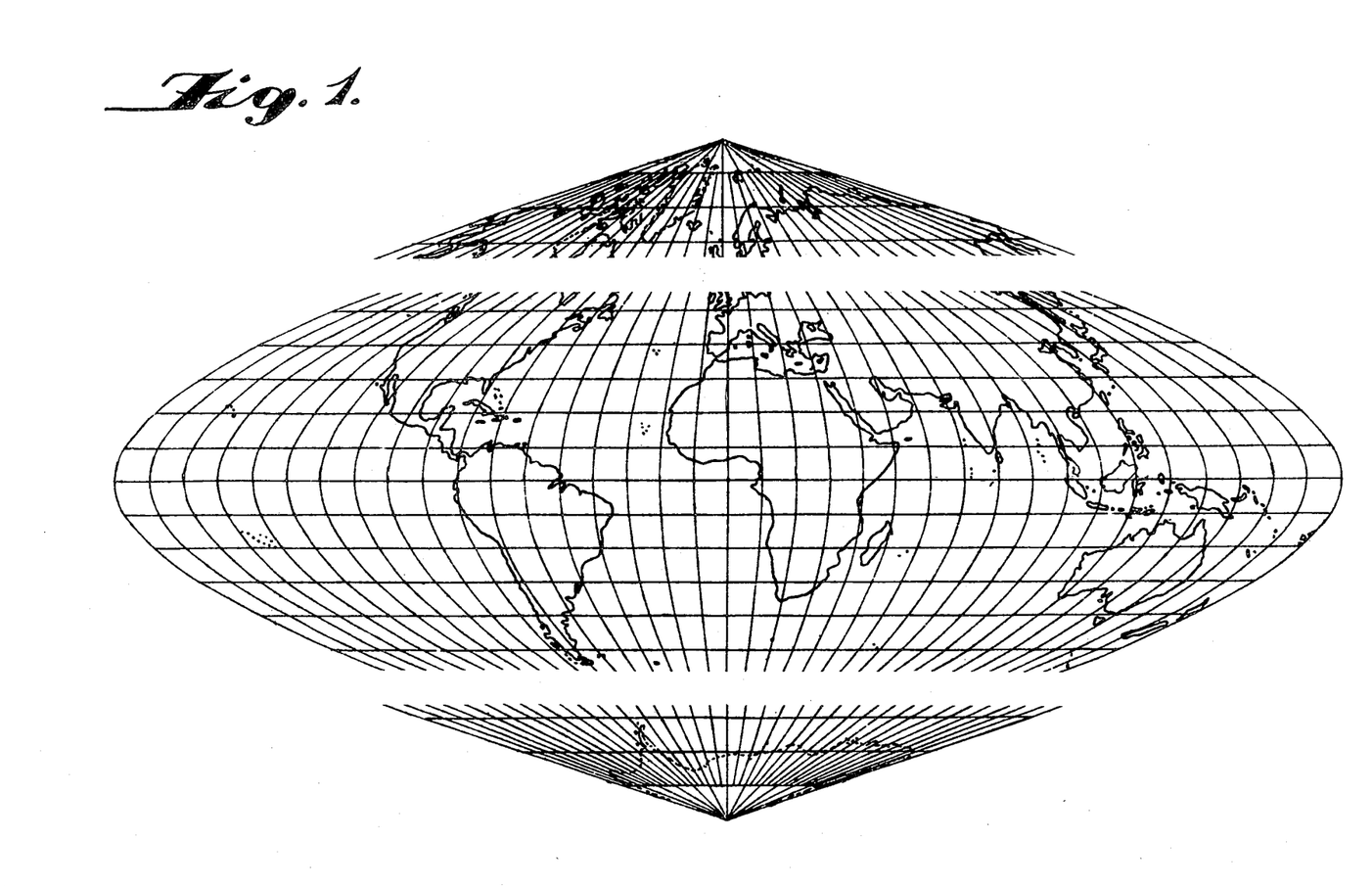
FIG. 1 illustrates a fusiform, equal-area world map used in making composite maps according to the present invention.

FIG. 1 shows this projection with parallels of latitude spaced 10° apart, as well as the meridians of longitude, and showing the continents in outline.

Table 1 gives certain values for dimensions of the map of latitudes 0° to 90° by 5° intervals, taking R as 10 units of length (centimeters, for example). The second column x, gives the length of half the parallels of latitude at the indicated latitude, that is, the value of x for the particular $\Phi$ when $\lambda$ is $\pi$. The linear scale of the map is equal along each parallel but differs from parallel to parallel. The third column shows the distance of each indicated parallel to latitude from the equator.

TABLE I

| | MAP I | |
|---|---|---|
| $\Phi$ | x | y |
| 0° | 31.4159 | 0 |
| 5 | 31.2964 | .8727 |
| 10 | 30.9386 | 1.7453 |
| 15 | 30.3454 | 2.6180 |
| 20 | 29.5213 | 3.4906 |
| 25 | 28.4724 | 4.3633 |
| 30 | 27.2066 | 5.2370 |
| 35 | 25.7344 | 6.1096 |
| 40 | 24.0659 | 6.9813 |
| 45 | 22.2144 | 7.8540 |
| 50 | 20.1938 | 8.7266 |
| 55 | 18.0194 | 9.5993 |
| 60 | 15.7080 | 10.4720 |
| 65 | 13.2769 | 11.3446 |
| 70 | 10.7449 | 12.2173 |
| 75 | 8.1310 | 13.0900 |
| 80 | 5.4553 | 13.9626 |
| 85 | 2.7381 | 14.8353 |
| 90 | 0 | 15.7080 |

VIII. Example—Flat-Polar Part

The corresponding flat-polar projection is derived from the above sinusoidal projection directly from Part II herein. From equation I, it is seen that $f(\Phi) = \Phi$, hence $f'(\Phi) = 1$ and $f(\pi/2) = \pi/2$, $f'(0) = 1$. Since $f(\alpha)$ has the same functional form as $f(\Phi)$, $f(\alpha) = \alpha$, and equations 7 and 8 become:

Mapping equations
$$n\sin\Phi = k\alpha + \sin\alpha,$$  (17)
$$x = \frac{RM\lambda}{k+1}(k + \cos\alpha), y = RM\alpha,$$  (19)

where $n = (k\pi + 2)/2$ and $M^2 = (k+1)/n$.

The axis ratio of the modified projection is $\frac{1}{2}$, the same as the unmodified projection. The ratio of the polar line to the equator is from equation (12) noting the $m = k+1$:

Ratio pole/equat. $$\frac{x_{90}}{x_0} = \frac{k}{k+1} \quad (20)$$

The condition is imposed that this ratio be ½ which results in k=½; M² become 6/(π+4) and n becomes (π+4)/4. Using numerical values for these constants, the mapping equations become:

$$x = .30553\, R\lambda\, (1 + 2\cos\alpha) \quad y = .91660\, R\alpha, \quad \text{II (64)}$$
$$1.78540 \sin\Phi = \alpha/2 + \sin\alpha. \quad (65)$$

Again R has been given a value of 10. With this value, the projections, in both cases, correspond to that of a globe of 10 units radius.

In order to use these equations, it is first necessary to find the values of α corresponding to the values of the latitude Φ. The value of Φ corresponding to a given value of α can be calculated directly from equation (65) and a table made up in this manner, and a reverse table then made with interpolated values for integral values of Φ. The above-cited text gives a graphic and a computational method for preparing a table of corresponding values, and a table (pages 25–27).

Figure 2:
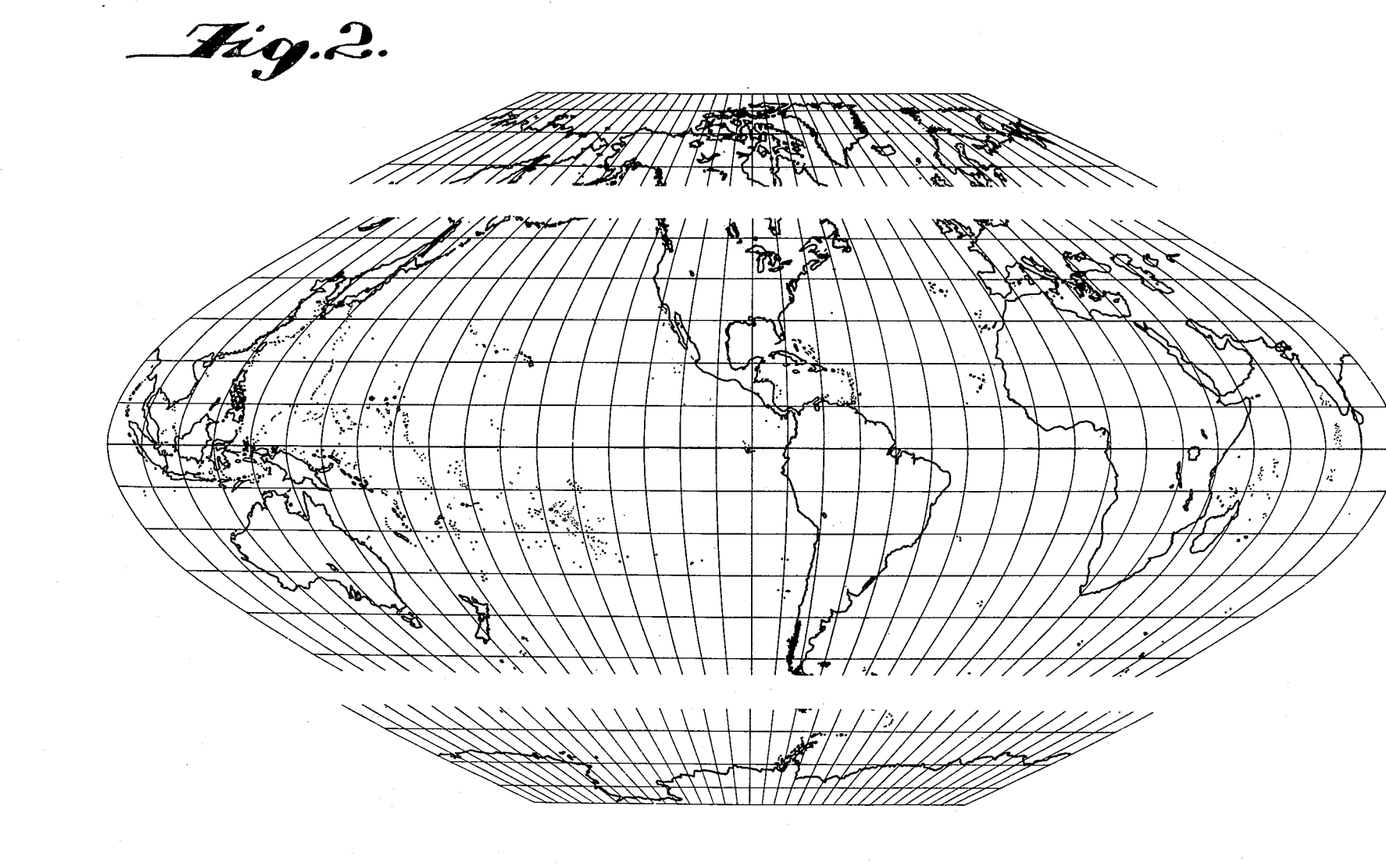
FIG. 2 illustrates a flat-polar equal-area world map used in making a composite map according to the present invention.

FIG. 2 shows the projection prepared according to equation II with R taken as 10 units of length.

Table II is similar to Table I with the values for Map II:

TABLE II

MAP II

| Φ ° | ° | ′ | α ″ | radians | x cm. | y cm. |
|---|---|---|---|---|---|---|
| 0 | 0 | 00 | 00.0 | 0.0000000 | 28.796 | 0.0000 |
| 5 | 5 | 57 | 03.3 | 0.1038629 | 28.692 | 0.9520 |
| 10 | 11 | 53 | 57.2 | 0.2076805 | 28.383 | 1.9036 |
| 15 | 17 | 50 | 31.3 | 0.3114023 | 27.872 | 2.8543 |
| 20 | 23 | 46 | 32.9 | 0.4149662 | 27.166 | 3.8036 |
| 25 | 29 | 41 | 45.2 | 0.5182910 | 26.275 | 4.7506 |
| 30 | 35 | 35 | 45.5 | 0.6212667 | 25.209 | 5.6945 |
| 35 | 41 | 28 | 02.2 | 0.7237403 | 23.984 | 6.6338 |
| 40 | 47 | 17 | 50.7 | 0.8254955 | 22.618 | 7.5665 |
| 45 | 53 | 04 | 07.1 | 0.9262224 | 21.133 | 8.4897 |
| 50 | 58 | 45 | 18.6 | 1.0254711 | 19.556 | 9.3994 |
| 55 | 64 | 19 | 09.0 | 1.1225813 | 17.918 | 10.290 |
| 60 | 69 | 42 | 15.6 | 1.2165699 | 16.257 | 11.151 |
| 65 | 74 | 49 | 34.9 | 1.3059662 | 14.623 | 11.970 |
| 70 | 79 | 33 | 32.4 | 1.3885665 | 13.078 | 12.728 |
| 75 | 83 | 43 | 01.2 | 1.4611375 | 11.699 | 13.393 |
| 80 | 87 | 02 | 39.2 | 1.5192084 | 10.588 | 13.925 |
| 85 | 89 | 13 | 54.3 | 1.5574879 | 9.8560 | 14.275 |
| 90 | 90 | 00 | 00.0 | 1.5707963 | 9.5986 | 14.398 |

IX. Example—Composite

In the unmodified map, the parallels of latitude decrease to zero from the equatorial regions whereas, in the modified map, they decrease to a particular value. Consequently, there is a latitude at which the lengths of the respective parallels are the same. This is shown by the following extract from Tables I and II.

| Lat. | (1) | (2) | Diff. |
|---|---|---|---|
| 50 | 20.1938 | 19.556 | +.6378 |
| 55 | 18.0194 | 17.918 | +.1014 |
| 60 | 15.7080 | 16.257 | −.5490 |
| 65 | 13.2769 | 14.623 | −1.3461 |

In this particular pair of maps, the parallel at which the value of x is the same for both maps lies between 55° and 60°. Interpolation in the above table gives 55° 46′ 23″ as a first approximation. This is sufficiently close, but a more precise value can be calculated. At this value for the latitude, the lengths of the parallels are the same and the linear scales along each are the same.

In accordance with the present invention, the composite map is formed by assembling the portion of Map I between latitudes 55° 46′ 23″ north and south, and the portions of Map II above this latitude north and south. The portions match precisely at the meeting lines; an area which lies along both sides of the meeting parallel remains continuous and without breaks in the composite. The corresponding meridians of longitude, which are both sine curves, meet without any break. There may be a slight shift in the tangent line to a meridian on crossing the meeting point, but this is rendered practically imperceptible by the conditions chosen in the above-described example.

Figure 3:
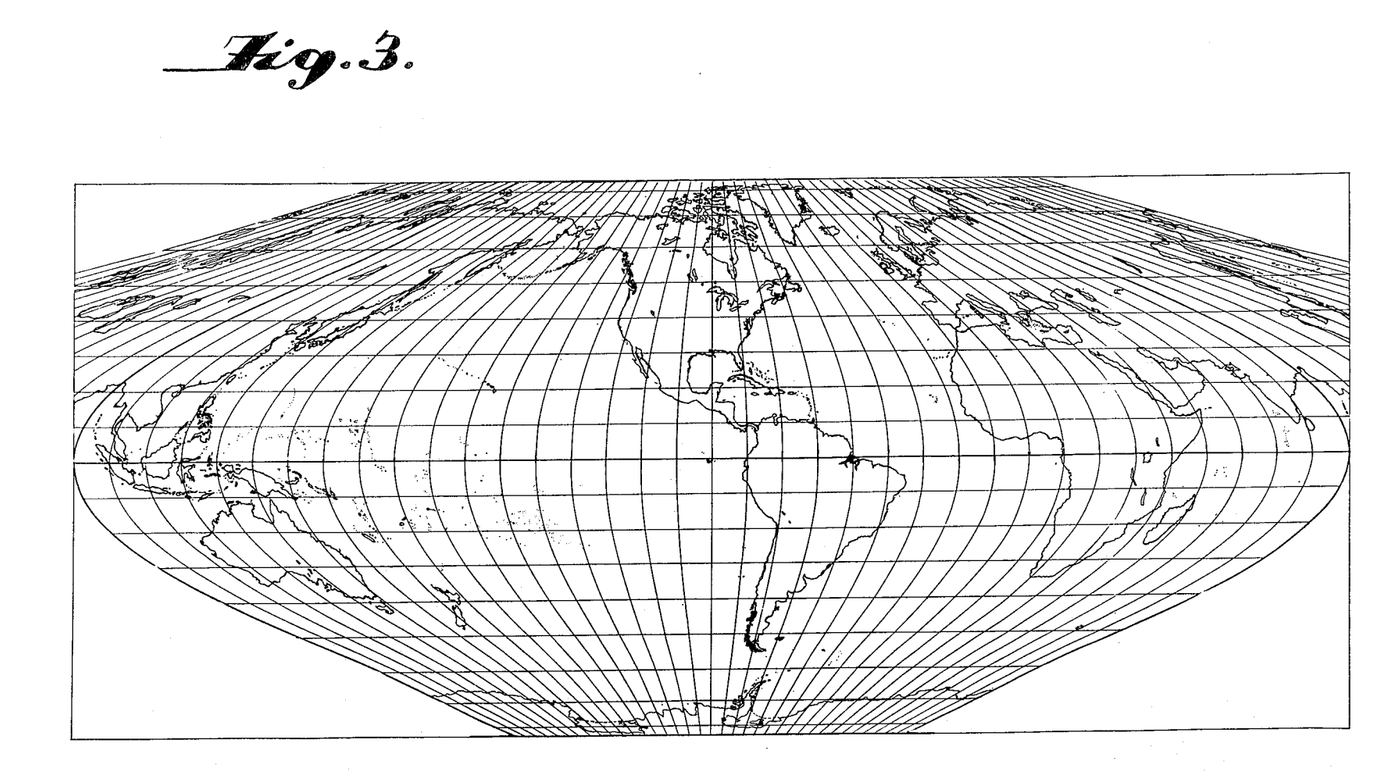
FIG. 3 is a homolinear composite equal-area world map according to the present invention derived from the maps of FIGS. 1 and 2.

FIG. 3 shows the composite projection formed from projections of FIGS. 1 and 2.

The composite projection retains the advantages of the fusiform projection in the equatorial and neighboring regions while avoiding the disadvantages of the flat-polar projection in these areas and, at the same time, avoids the disadvantages of the fusiform projection in the polar and neighboring regions.

Figure 4:
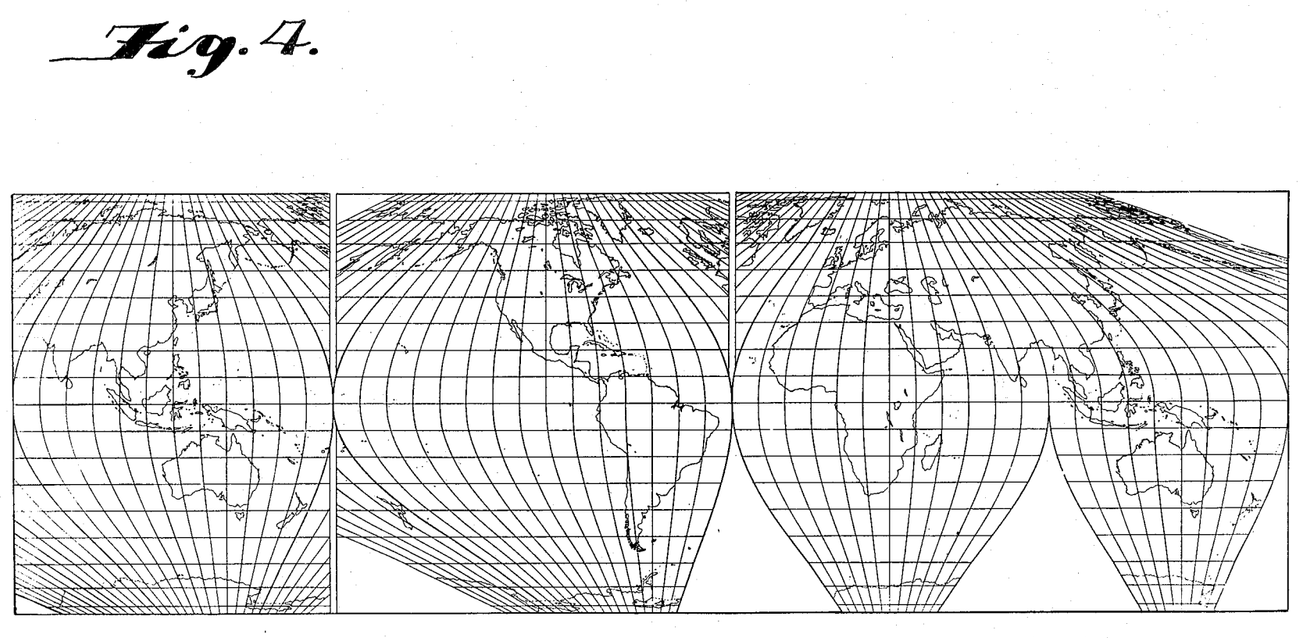
FIG. 4 is another homolinear composite equal-area world map according to the present invention.

The above has considered only the mapping of the entire area of the earth. If desired, the mapping can be extended east and west beyond longitude 180° so as to show certain regions (such as the polar or northern regions) twice, as depicted in FIG. 3. Also the present mapping is suitable for the hemispheres and, while it can be used for smaller portions of the earth's surface, there is no special advantage for small portions, unless they are to be in large-scale sectional sheets, combined to form a large-area map, such as hemisphere or world. The mapping is also useful for interrupted mappings, as depicted in FIG. 4.

In the above, the equal-area projection of the earth treated as a perfect sphere has been considered. This is sufficiently accurate for small-scale maps. For large-scale maps, for example one designed to cover the wall of a room or to be hung on the wall or to be used as large sectional sheets, it may be desirable to apply the projections to the oblate spheroid. This is done by substituting for the geodetic latitude Φ a corresponding latitude β obtained by projecting the spheroid equal areally upon a sphere of the same surface area. U.S. Coast and Geodetic Survey Special Publication No. 67 gives the necessary table, for every half degree.

I claim:

1. An equal-area homolinear composite world map having parallels of latitude parallel to the equator and comprising an equatorial map section and polar map sections, said equatorial map section being the equatorial portion of a fusiform equal-area world map, having a graticule prepared according to first mapping equations, said polar map sections being the polar map sections of a flat-polar area world map having a graticule prepared according to second mapping equations, said equatorial section and said polar sections being joined along parallels which, using the same linear mapping scale, are of equal length, and said second mapping equations being derived solely by modifying said first mapping equations of said fusiform map so that the poles of the graticule of said flat-polar map are linear rather than pointed.

2. A method of making an equal-area homolinear composite world map having parallels of latitude parallel to the equator and comprising an equatorial map section and polar map sections, said equatorial map section being the equatorial portion of a fusiform equal-area world map having a graticule prepared according to first mapping equations, said polar map sections being the polar map sections of a flat-polar equal-area world map having a graticule prepared according to second mapping equations, said second mapping equations being derived solely by modifying said first mapping equations of said fusiform map so that the poles of the graticule of said flat-polar map are linear rather than pointed, said method comprising joining said equatorial and polar sections along parallels which, using the same linear mapping scale, are of equal length.

* * * * *